US011618363B1

(12) United States Patent
Boykin, Sr.

(10) Patent No.: US 11,618,363 B1
(45) Date of Patent: Apr. 4, 2023

(54) FLATBED TRAILER ASSEMBLY

(71) Applicant: Paul Boykin, Sr., Dayton, OH (US)

(72) Inventor: Paul Boykin, Sr., Dayton, OH (US)

( * ) Notice: Subject to any disclaimer, the term of this patent is extended or adjusted under 35 U.S.C. 154(b) by 0 days.

(21) Appl. No.: 17/501,590

(22) Filed: Oct. 14, 2021

(51) Int. Cl.
*B60P 1/43* (2006.01)

(52) U.S. Cl.
CPC .................... *B60P 1/435* (2013.01)

(58) Field of Classification Search
CPC .. B60P 1/43; B60P 1/435; B60P 1/433; B62D 33/033; B62D 33/0273
USPC ............... 296/186.5, 52, 59, 61, 106, 148
See application file for complete search history.

(56) References Cited

U.S. PATENT DOCUMENTS

| 4,792,274 | A | 12/1988 | Cockram | |
|---|---|---|---|---|
| 5,342,105 | A | 8/1994 | Miles | |
| 5,558,486 | A * | 9/1996 | Paproski | B60P 3/06 |
| | | | | 414/537 |
| D418,451 | S * | 1/2000 | Konecheck | D12/101 |
| 6,170,856 | B1 * | 1/2001 | Pena | B62D 53/00 |
| | | | | 280/789 |
| 7,503,612 | B1 | 3/2009 | Taylor | |
| 8,347,440 | B1 * | 1/2013 | Runyan | B60P 1/435 |
| | | | | 14/71.1 |
| 8,500,184 | B2 | 8/2013 | Fraley | |
| 9,670,013 | B2 | 6/2017 | Parrish | |
| 2003/0222431 | A1 * | 12/2003 | Crosby | B60P 3/122 |
| | | | | 280/656 |
| 2007/0031226 | A1 * | 2/2007 | Hynes | B60P 1/43 |
| | | | | 414/482 |
| 2007/0045993 | A1 | 3/2007 | Jager | |
| 2013/0192008 | A1 | 8/2013 | Smith | |

* cited by examiner

*Primary Examiner* — Joseph D. Pape
*Assistant Examiner* — Veronica M Shull

(57) ABSTRACT

A flatbed trailer assembly for defining ramps on a trailer includes a flatbed trailer that has a deck and a perimeter wall surrounding the deck to retain objects on the deck while transporting the objects. The perimeter wall has a pair of removable sections that is each removably attached to the deck. Each of the removable sections is positionable in a ramp orientation having the removable sections angling downwardly from the deck. In this way the pair of removable sections defines a pair of ramps. Thus, a wheeled vehicle may be driven onto the flatbed trailer on each of the ramps.

6 Claims, 8 Drawing Sheets

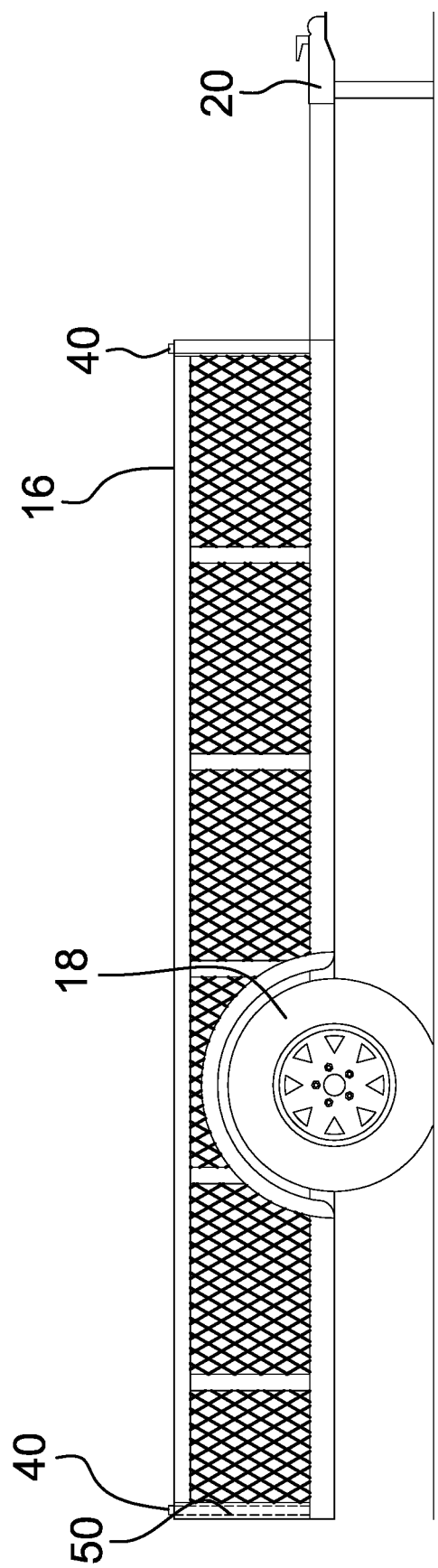

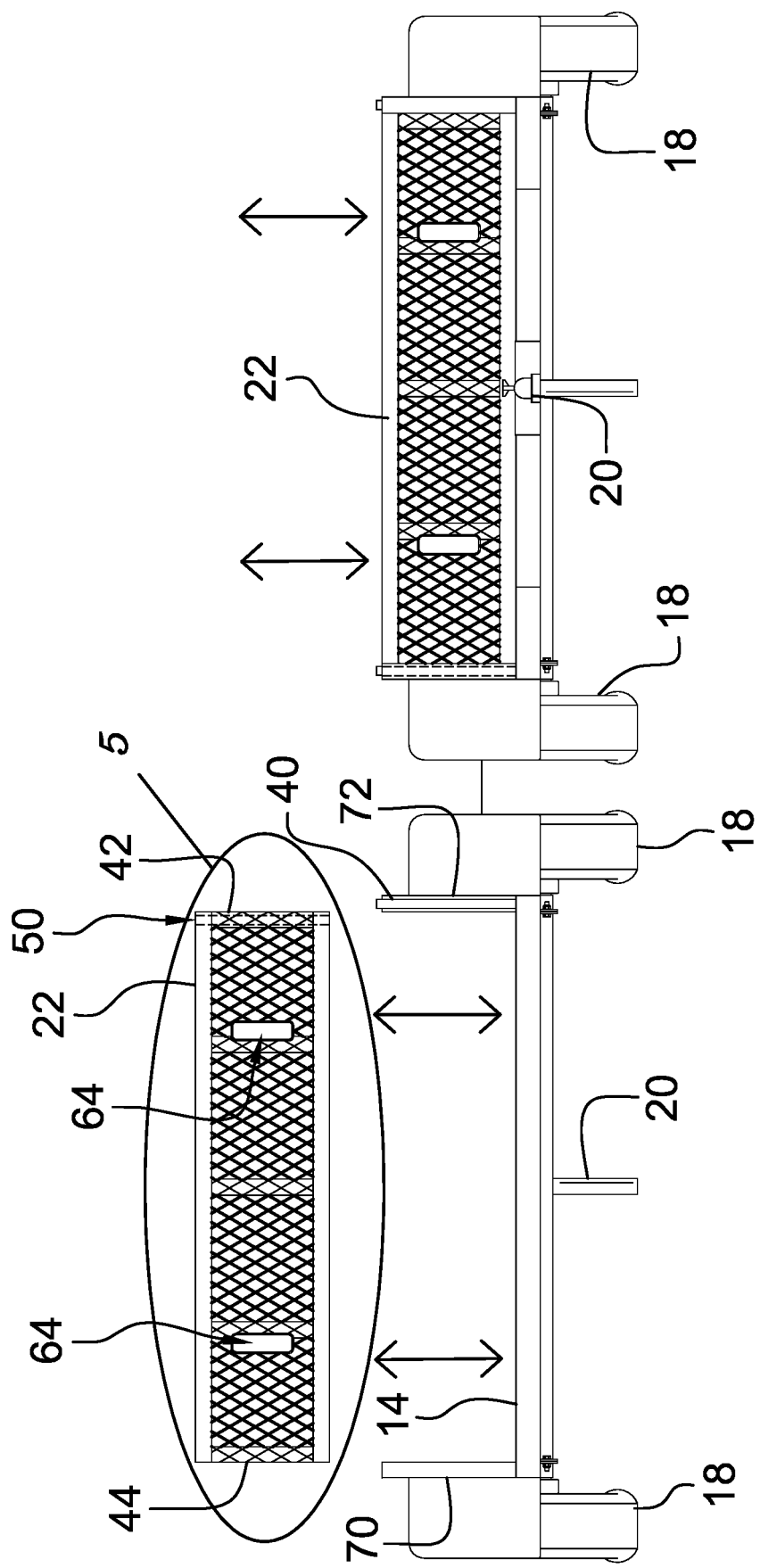

FLATBED TRAILER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to trailer devices and more particularly pertains to a new trailer device for defining ramps on a trailer. The device includes a flatbed trailer that includes a perimeter wall. The perimeter wall includes a pair of removable sections that can each be detached from the flatbed trailer. Additionally, each of the removable sections can be positioned to angle downwardly from the flatbed trailer to define a pair of ramps. In this way a wheeled vehicle can be driven onto the flatbed trailer.

(2) Description of Related Art Including Information Disclosed Under 37 CFR 1.97 and 1.98

The prior art relates to trailer devices including a trailer that has an automatically folding end ramp. The prior art discloses a convertible end-gate for a truck that converts into a ramp. The prior art discloses a variety of trailers that have end ramps that are pivotally coupled to the trailer. The prior art discloses an extension panel that is attachable to a bed of a pickup truck and a pair of ramps each coupled to the extension panel for loading a wheeled vehicle into the bed of the pickup truck. The prior art discloses a trailer that includes a front wall and a rear wall that are positionable in an upright position or a lowered position. The prior art discloses a method of removably attaching a ramp to a trailer.

BRIEF SUMMARY OF THE INVENTION

An embodiment of the disclosure meets the needs presented above by generally comprising a flatbed trailer that has a deck and a perimeter wall surrounding the deck to retain objects on the deck while transporting the objects. The perimeter wall has a pair of removable sections that is each removably attached to the deck. Each of the removable sections is positionable in a ramp orientation having the removable sections angling downwardly from the deck. In this way the pair of removable sections defines a pair of ramps. Thus, a wheeled vehicle to be driven onto the flatbed trailer on each of the ramps.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is a right side view of a flatbed trailer assembly according to an embodiment of the disclosure.

FIG. 2 is a back view of an embodiment of the disclosure.

FIG. 3 is a front view of an embodiment of the disclosure.

DETAILED DESCRIPTION OF THE INVENTION

Figure 4:
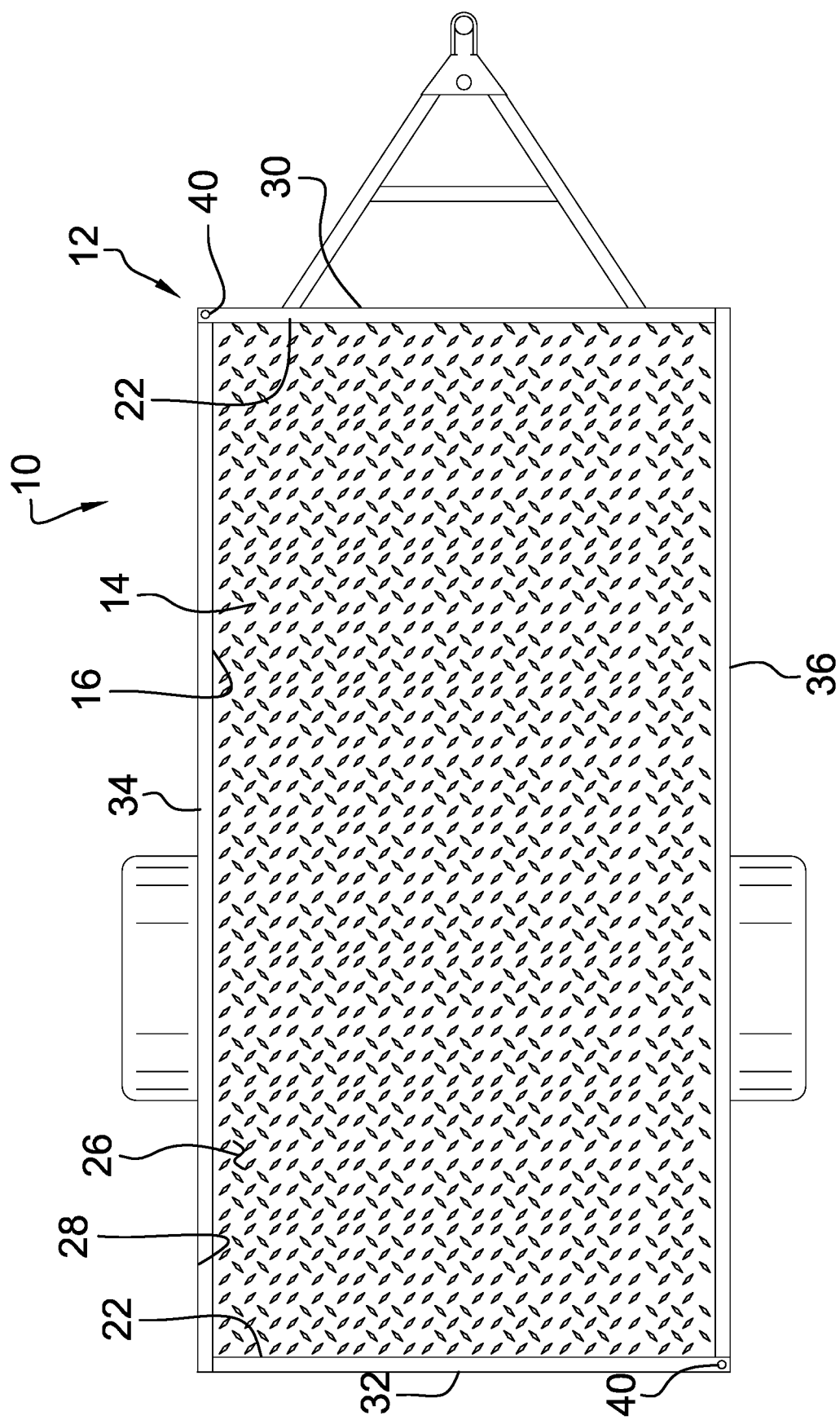
FIG. 4 is a top view of an embodiment of the disclosure.
Figure 5:
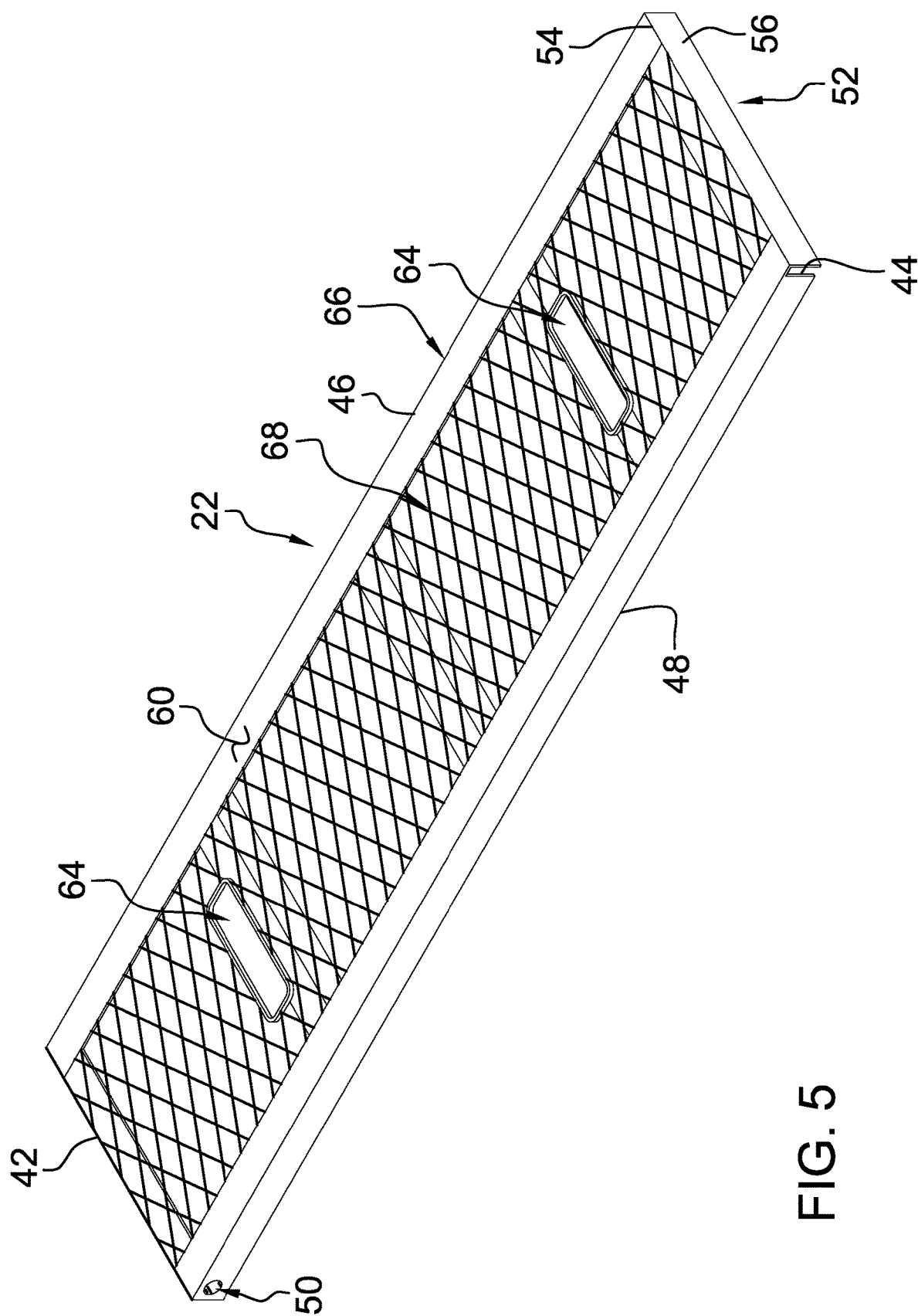
FIG. 5 is a perspective view of a ramp of an embodiment of the disclosure.
Figure 6:
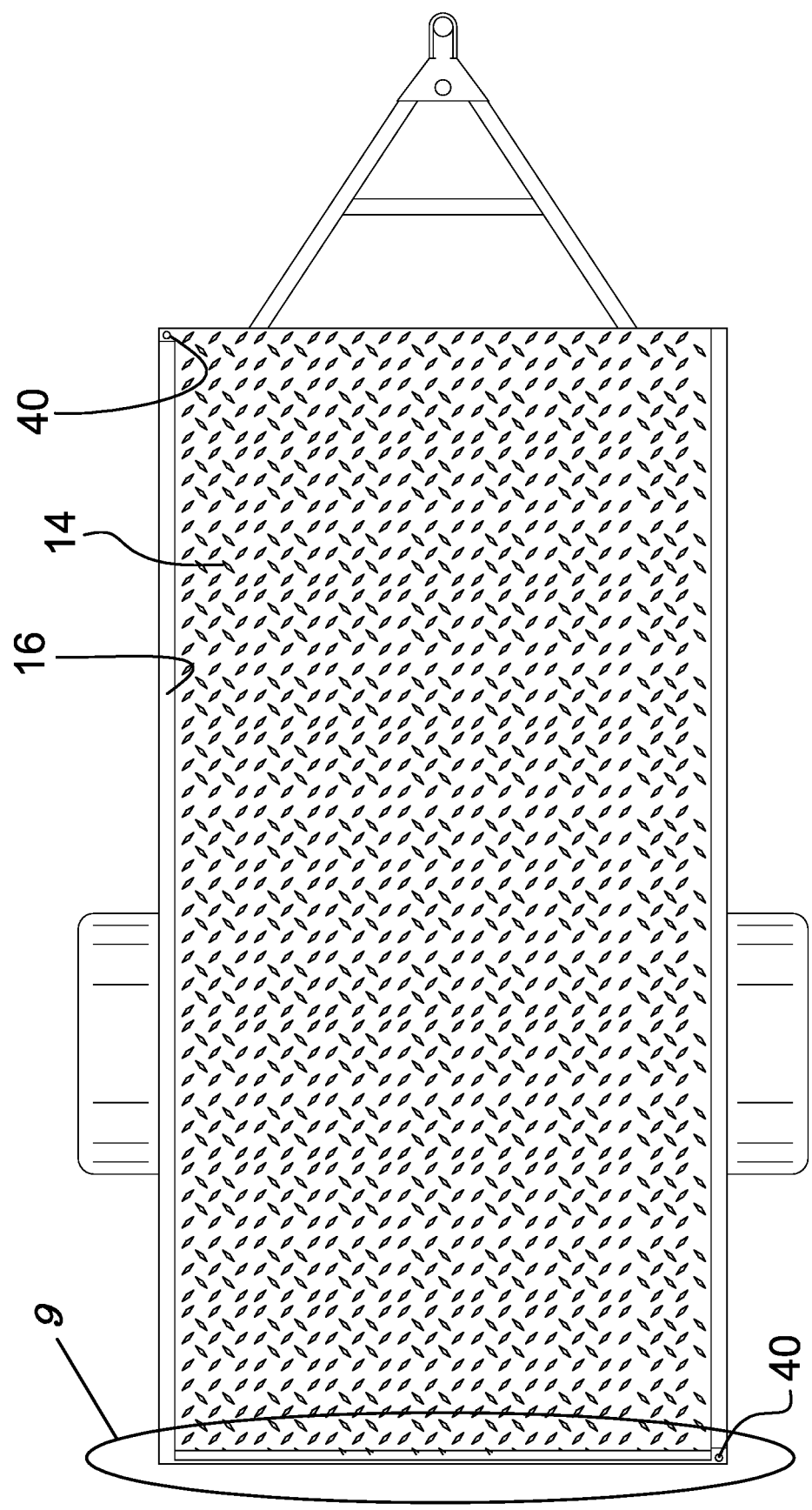
FIG. 6 is a top view of an embodiment of the disclosure showing a pair of removable sections being removed from a trailer.
Figure 7:
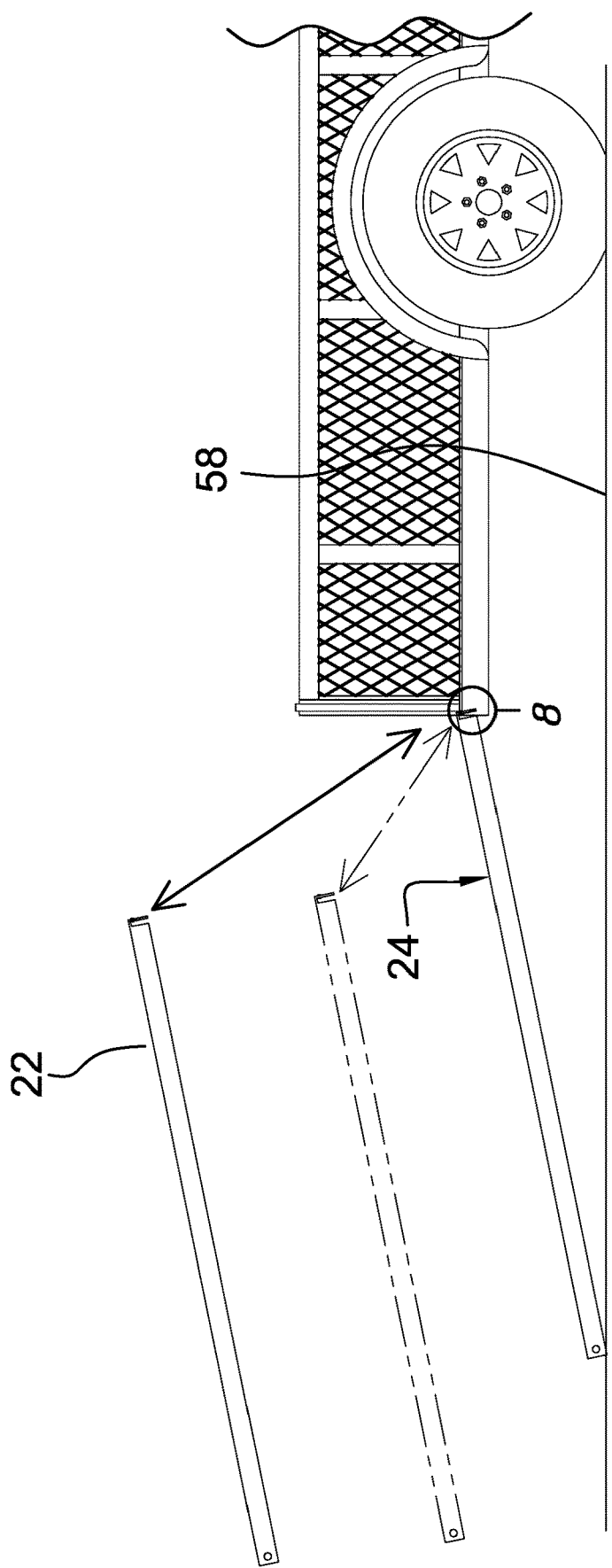
FIG. 7 is a perspective in-use view of an embodiment of the disclosure showing a removable section being oriented on a trailer to define a ramp.
Figure 8:
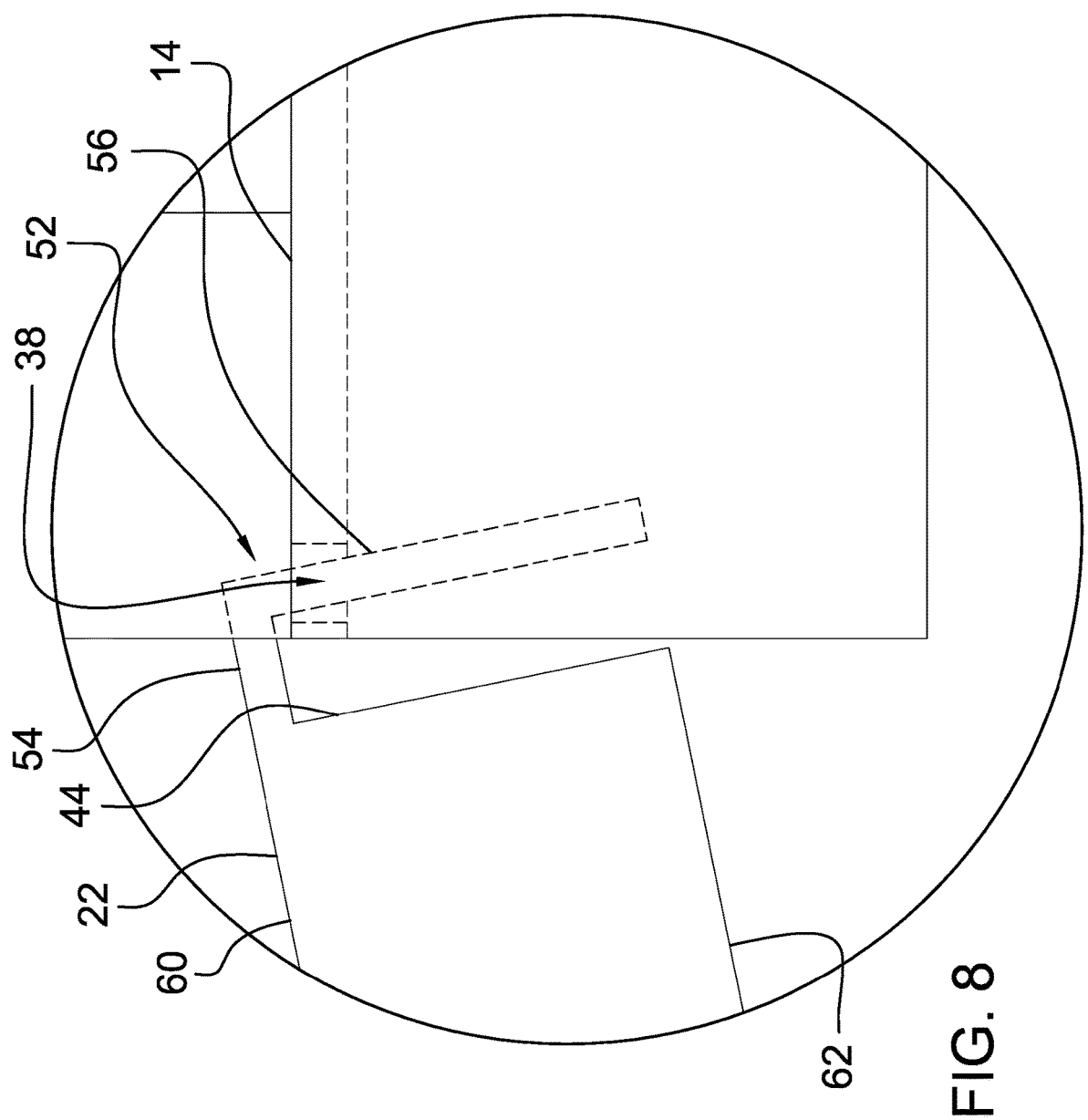
FIG. 8 is a detail view taken from circle 8 of FIG. 7 of an embodiment of the disclosure.
Figure 9:
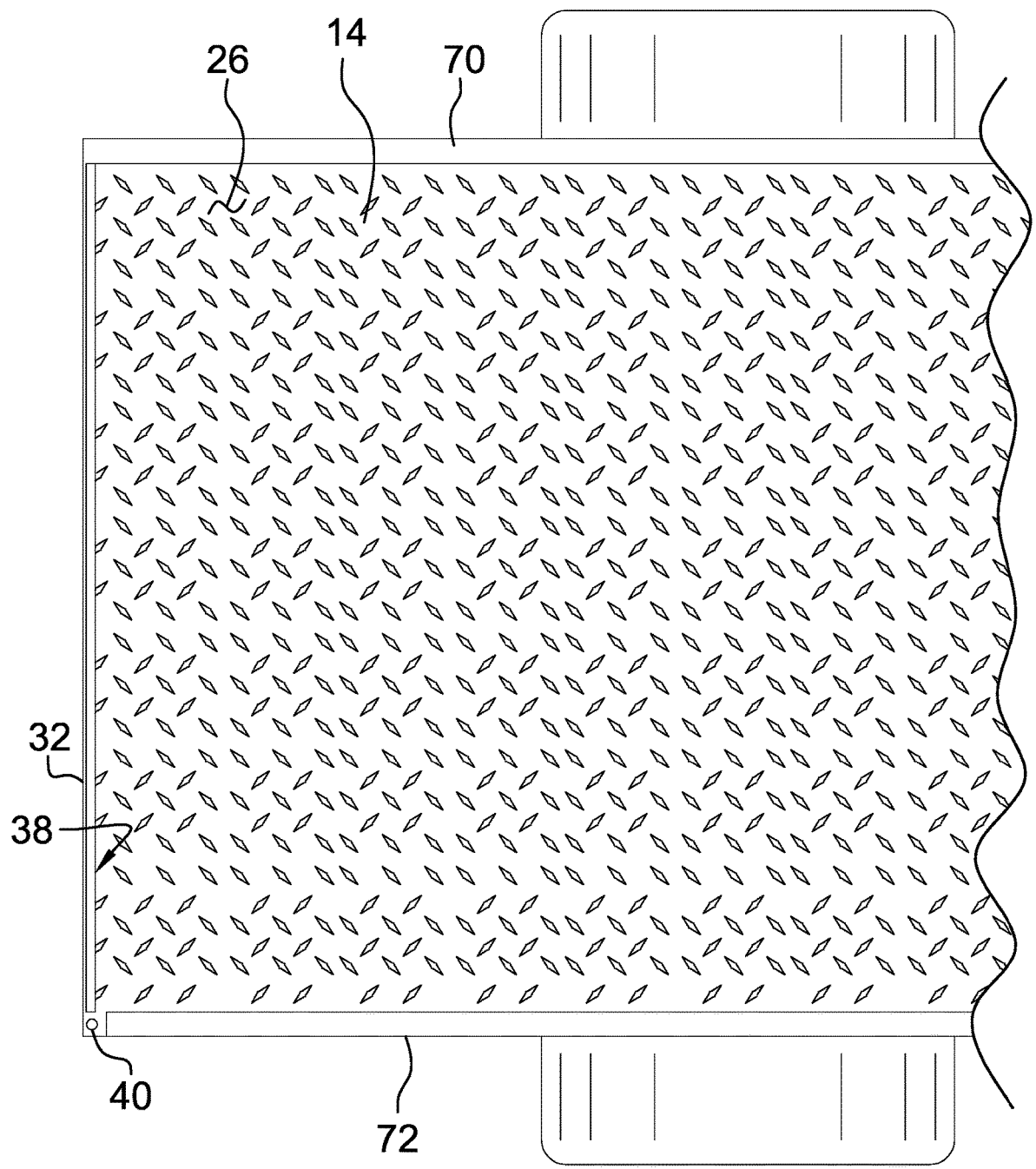
FIG. 9 is a detail view taken from circle 9 of FIG. 6 of an embodiment of the disclosure.

With reference now to the drawings, and in particular to FIGS. 1 through 9 thereof, a new trailer device embodying the principles and concepts of an embodiment of the disclosure and generally designated by the reference numeral 10 will be described.

As best illustrated in FIGS. 1 through 9, the flatbed trailer assembly 10 generally comprises a flatbed trailer 12 that has a deck 14 and a perimeter wall 16 surrounding the deck 14 to retain objects on the deck 14 while transporting the objects. The flatbed trailer 12 includes a pair of wheels 18, a hitch 20 and other hardware that is common to trailers that are towed behind motorized vehicles. The perimeter wall 16 has a pair of removable sections 22 that is each removably attached to the deck 14. Each of the removable sections 22 is positionable in a ramp orientation having the removable sections 22 angling downwardly from the deck 14. In this way the pair of removable sections 22 defines a pair of ramps 24 to facilitate a wheeled vehicle to be driven onto the flatbed trailer 12.

The deck 14 has a top surface 26 and a perimeter edge 28, and the perimeter edge 28 has a front side 30, a back side 32, a first lateral side 34 and a second lateral side 36. The deck 14 has a slot 38 extending downwardly through the top surface 26. The slot 38 extends between the first lateral side 34 and the second lateral side 36, and the slot 38 is positioned adjacent to the back side 32. A pair of rods 40 is each coupled to and extends upwardly from the top surface 26 of the deck 14. Each of the rods 40 is positioned adjacent to a respective one of an intersection between the front side 30 and the first lateral side 34 and an intersection between the back side 32 and the second lateral side 36.

Each of the removable sections 22 has a first end 42, a second end 44, a top edge 46 and a bottom edge 48, and each of the removable sections 22 is elongated between the first end 42 and the second end 44. Each of the removable sections 22 has a rod hole 50 extending through the top edge 46 and the bottom edge 48, and the rod hole 50 is positioned adjacent to the first end 42. Furthermore, the rod hole 50 in each of the removable sections 22 insertably receives a respective one of the rods 40 for pivotally retaining the removable sections 22 on the deck 14.

The second end 44 of each of the removable sections 22 includes an engagement 52 extending along a full length of the second end 44. The engagement 52 includes a leg 54 extending away from the second end 44 and a foot 56 extending downwardly from the leg 54. The foot 56 of the engagement 52 on each of the removable sections 22 is insertable into the slot 38 in the top surface 26 of the deck 14 when the removable sections 22 are positioned in the ramp orientation. In this way each of the removable sections 22 is positioned to angle downwardly between the back side 32 of the perimeter edge 28 of the deck 14 and a support surface 58. Furthermore, each of the removable sections 22 can be spaced apart from each other a variety of distances to accommodate differing sizes of wheeled vehicles.

Each of the removable sections 22 has an upper surface 60 and a lower surface 62, and each of the removable sections 22 has a pair of openings 64 each extending through the upper surface 60 and the lower surface 62. Moreover, each of the openings 64 in each of the removable sections 22 can accommodate a hand for gripping the removable sections 22. Each of the openings 64 in a respective one of the removable sections 22 is positioned adjacent to a respective one of the first end 42 and the second end 44 of the respective removable section. All four sides of the perimeter wall 16, including each of the removable sections 22, may comprise a frame 66 which surrounds a mesh panel 68. Additionally, the deck 14 of the flatbed trailer 12 may comprise diamond plate steel panel or other resilient material.

In use, each of the removable sections 22 is positioned on the respective rod 40 such that each of the removable sections 22 extends between a first lateral side 70 and a second lateral side 72 of the perimeter wall 16. Each of the removable sections 22 is removable from the respective pole and the foot 56 of the engagement 52 on each of the removable sections 22 is insertable into the slot 38 in the deck 14. In this way each of the removable sections 22 is oriented to angle downwardly from the deck 14 to define a ramp. Thus, the wheeled vehicle can be rolled onto the flatbed trailer 12. Each of the removable sections 22 can be replaced back on the respective rod 40 once the wheeled vehicle is rolled onto the flatbed trailer 12 or the wheeled vehicle can be transported on the flatbed trailer 12 without the removable sections 22. In this way a wheeled vehicle that has a length which is greater than the length of the deck 14, for example, can still be transported on the flatbed trailer 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A flatbed trailer assembly having a pair of walls that are positionable to serve as ramps, said assembly comprising:
   a flatbed trailer having a deck and a perimeter wall surrounding said deck wherein said perimeter wall is configured to retain objects on said deck while transporting the objects, said perimeter wall having a pair of removable sections each being removably attached to said deck, each of said removable sections being positionable in a ramp orientation having said removable sections angling downwardly from said deck such that said pair of removable sections defines a pair of ramps wherein said ramps are configured to facilitate a wheeled vehicle to be driven onto said flatbed trailer;
   wherein said deck has a top surface and a perimeter edge, said perimeter edge having a front side, a back side a first lateral side and a second lateral side, said deck having a slot extending downwardly through said top surface, said slot extending between said first lateral side and said second lateral side, said slot being positioned adjacent to said back side;
   wherein said assembly includes a pair of rods, each of said rods being coupled to and extending upwardly from said top surface of said deck, each of said rods being positioned adjacent to a respective one of an intersection between said front side and said first lateral side and an intersection between said back side and said second lateral side; and
   wherein each of said removable sections has a first end, a second end, a top edge and a bottom edge, each of said removable sections being elongated between said first end and said second end, each of said removable sections has a rod hole extending through said top edge and said bottom edge, said rod hole being positioned adjacent to said first end, said rod hole in each of said removable sections insertably receiving a respective one of said rods for pivotally retaining said removable sections on said deck.

2. A flatbed trailer assembly having a pair of walls that are positionable to serve as ramps, said assembly comprising:
- a flatbed trailer having a deck and a perimeter wall surrounding said deck wherein said perimeter wall is configured to retain objects on said deck while transporting the objects, said perimeter wall having a pair of removable sections each being removably attached to said deck, each of said removable sections being positionable in a ramp orientation having said removable sections angling downwardly from said deck such that said pair of removable sections defines a pair of ramps wherein said ramps are configured to facilitate a wheeled vehicle to be driven onto said flatbed trailer;
- wherein said deck has a top surface and a perimeter edge, said perimeter edge having a front side, a back side a first lateral side and a second lateral side, said deck having a slot extending downwardly through said top surface, said slot extending between said first lateral side and said second lateral side, said slot being positioned adjacent to said back side;
- wherein said assembly includes a pair of rods, each of said rods being coupled to and extending upwardly from said top surface of said deck, each of said rods being positioned adjacent to a respective one of an intersection between said front side and said first lateral side and an intersection between said back side and said second lateral side; and
- wherein each of said removable sections has a first end and a second end, said second end of each of said removable sections includes an engagement extending along a full length of said second end, said engagement including a leg extending away from said second end and a foot extending downwardly from said leg.

3. The assembly according to claim 2, wherein said foot of said engagement on each of said removable sections being insertable into said slot in said top surface of said deck when said removable sections are positioned in said ramp orientation having each of said removable sections angling downwardly between said back side of said perimeter edge of said deck and a support surface.

4. A flatbed trailer assembly having a pair of walls that are positionable to serve as ramps, said assembly comprising:
- a flatbed trailer having a deck and a perimeter wall surrounding said deck wherein said perimeter wall is configured to retain objects on said deck while transporting the objects, said perimeter wall having a pair of removable sections each being removably attached to said deck, each of said removable sections being positionable in a ramp orientation having said removable sections angling downwardly from said deck such that said pair of removable sections defines a pair of ramps wherein said ramps are configured to facilitate a wheeled vehicle to be driven onto said flatbed trailer;
- wherein said deck has a top surface and a perimeter edge, said perimeter edge having a front side, a back side, a first lateral side and a second lateral side, said deck having a slot extending downwardly through said top surface, said slot extending between said first lateral side and said second lateral side, said slot being positioned adjacent to said back side;
- wherein said assembly includes a pair of rods, each of said rods being coupled to and extending upwardly from said top surface of said deck, each of said rods being positioned adjacent to a respective one of an intersection between said front side and said first lateral side and an intersection between said back side and said second lateral side; and
- wherein each of said removable sections has an upper surface and a lower surface, each of said removable sections having a pair of openings each extending through said upper surface and said lower surface wherein each of said openings in each of said removable sections is configured to accommodate a hand for gripping said removable sections.

5. The assembly according to claim 4, wherein each of said openings in a respective one of said removable sections is positioned adjacent to a respective one of said first end and said second end of said respective removable section.

6. The assembly according to claim 1, wherein
said second end of each of said removable sections includes an engagement extending along a full length of said second end, said engagement including a leg extending away from said second end and a foot extending downwardly from said leg, said foot of said engagement on each of said removable sections being insertable into said slot in said top surface of said deck when said removable sections are positioned in said ramp orientation having each of said removable sections angling downwardly between said back side of said perimeter edge of said deck and a support surface, each of said removable sections having an upper surface and a lower surface, each of said removable sections having a pair of openings each extending through said upper surface and said lower surface wherein each of said openings in each of said removable sections is configured to accommodate a hand for gripping said removable sections, each of said openings in a respective one of said removable sections being positioned adjacent to a respective one of said first end and said second end of said respective removable section.

\* \* \* \* \*